(12) United States Patent
Nunally

(10) Patent No.: US 7,443,057 B2
(45) Date of Patent: Oct. 28, 2008

(54) REMOTE POWER CHARGING OF ELECTRONIC DEVICES

(75) Inventor: Patrick Nunally, Escondido, CA (US)

(73) Assignee: Patrick Nunally, San Diego, CA (US)

(*) Notice: Subject to any disclaimer, the term of this patent is extended or adjusted under 35 U.S.C. 154(b) by 331 days.

(21) Appl. No.: 10/999,799

(22) Filed: Nov. 29, 2004

(65) Prior Publication Data
US 2006/0113955 A1  Jun. 1, 2006

(51) Int. Cl.
H05K 7/14 (2006.01)

(52) U.S. Cl. ...................................... 307/149

(58) Field of Classification Search ................... 307/149
See application file for complete search history.

(56) References Cited

U.S. PATENT DOCUMENTS

| | | |
|---|---|---|
| 3,114,517 A | 12/1963 | Brown |
| 3,174,705 A | 3/1965 | Schiff et al. |
| 3,781,647 A | 12/1973 | Glaser |
| 6,114,834 A | 9/2000 | Parlse |
| 2006/0058076 A1* | 3/2006 | Mickle et al. ............... 455/574 |
| 2006/0063522 A1* | 3/2006 | McFarland .................. 455/423 |

* cited by examiner

Primary Examiner—Robert L. DeBeradinis
(74) Attorney, Agent, or Firm—Stein, McEwen & Bui, LLP

(57) ABSTRACT

A wireless charging and power system for electronic devices and method for communicating power to a power receiver employing wireless energy transmission are disclosed. The remote charging system includes a power transmission unit, which transmits energy as a plurality of constructive transmitted frequencies, and a power receiver system that receives the transmitted frequencies. The power receiver system is preferably incorporated in a device and includes an energy receptor capable of receiving the wireless transmitted energy and transferring the energy from the transmitted frequencies to an energy storage device included in the device. The power transmission unit receives and tracks a power request signal from the power receiver system to track the power receiver system location during energy transmission. Data streams may be incorporated into the wireless signals of the remote charging system, allowing the remote charging system to function as a communications pathway as well as a power delivery system.

14 Claims, 6 Drawing Sheets

REMOTE POWER CHARGING OF ELECTRONIC DEVICES

BACKGROUND OF THE INVENTION

1. Field of the Invention

The present invention relates in general to a wireless energy signal system. One particular aspect of the present invention relates to a remote (also called wireless) power transmission system for charging, recharging and/or generally powering electronic apparatuses or devices.

2. Description of the Related Art

Millions of portable electronic devices are in use today. Each of these devices employs a power source, which requires periodic maintenance such as replacement of a battery or connection to a charger. Many users simply forget to connect the electronic device to the charger and are left without sufficient power to use their portable devices. Many portable devices are intended for used at all times, thus creating a need for improved systems and methods for charging these devices.

Wireless energy signal is defined as point-to-point energy or power transmission through free space (a vacuum), the atmosphere, or other media, without the use of conductors, such as electrical wires. As used herein, the term wireless transmission includes all types of conductor-less transmissions. When power is transmitted wirelessly, attenuation of the energy from the transmitter to the receiver is generally a function of the distance that separates them, principally because the medium through which the energy travels affects the energy.

Wireless energy signal systems have been proposed to convert large quantities of solar energy into an energy beam that could be transmitted from outer space to the surface of the earth through satellite transmissions. Once on earth, the energy beam would be converted back to a usable energy form that would be pumped into the existing electrical energy distribution grid. See, for example, U.S. Pat. Nos. 3,114,517; 3,781,647; and 3,174,705. Other proposed wireless energy signal systems use several transmission frequencies of the energy spectrum in order to minimize the energy loss from the beam as it travels through the atmosphere, including radio frequency (RF), laser, and optical frequency (OF). For the RF energy beam, atmospheric attenuation may reach 4 GHz even during a heavy rainstorm. Other windows of transmission which are 0.5 to 1 GHz wide exist around 35 GHz and 94 GHz, for example. Systems designed to operate at these relatively high frequencies have the added advantage of operating at smaller apertures wherein the transmitting antenna and the receiving antenna can be smaller. Such systems have been considered for transmission of energy from satellites in a low earth orbit or geosynchronous orbit to the surface of the earth, a distance of many kilometers. Transmitting from space to the surface of the earth greatly diminishes laser based energy beam capabilities due to the long distances the laser beam must travel in the earth's atmosphere.

Thus, there currently exists a need for improved systems and methods for remote, wireless, charging and recharging systems that can sequentially and/or simultaneously power electronic devices.

SUMMARY OF THE INVENTION

Briefly stated, the invention comprises a power transmission unit and a power receiver system. In some embodiments there can be a plurality of power transmission units, each interconnected to one or more power sources, such as, for instance, the existing electrical power transmission grid. Each power transmission unit (PTU) includes a power transmitter selectively changeable between stand-by, 'ON' and 'OFF' conditions.

In one embodiment, the PTU comprises components for sending and/or receiving a communication signal and a power transmission. In particular, in the 'ON' condition, the PTU (upon receipt of a signal indicating the need for a power transmission) transforms energy from a power source into a transmitted frequency. This energy may then be wirelessly transmitted to one or more power receiving units (PRU). In one embodiment, once the PRU receives the energy via the wireless energy signal, the PRU transmits a signal to the PTO indicating that a secondary sequence of power transmission may be transmitted from the PTU. In this embodiment, the first and the second transmitted energy signal are constructively added in order to deliver greater power to the PRU. Thus, in one embodiment the invention comprises a process of transmitting multiple energy signals from the PTU and using feedback from the PRU indicating constructive alignment of the energy signals from the PTU.

In one embodiment, the PTU device is a logic type device incorporating microprocessors and functions to control the overall operation of the PTU. In another embodiment, the PTU includes safety devices and signal locating and tracking capabilities, as well as a device (or devices) for changing the operating parameters and/or orientation of the signals transmitted by the power transmitter.

In one embodiment, the power receiving Unit (PRU) comprises a number of operably interconnected components. The PRU may include an energy receptor, such as an antenna, receptor/converter, transducer, or combination of these components. The energy receptor is configured to receive the power transmitted from the PTU. The PRU may also comprise an energy converter, which converts the energy received by the receptor to a form of energy capable of direct use and/or storage in an energy storage device.

In one embodiment, a power usage module monitors the energy levels in the energy storage device, the energy being expended, and/or energy being received by the energy receptor. In some applications, feedback from the PRU is used to determine optimal power transmission unification, such as whether additional energy signals may be combined to increases a power level received by the energy receptor. In alternate embodiments, a transmitter/locator or "a data feedback unit" can be operably connected to the PRU. The data feedback unit functions to transmit a data feedback unit signal from the PRU to the PTU in either absolute or relative terms.

In one embodiment, the PRU is incorporated into a device, such as a medical monitoring device, audio/video capture device, security device, command/control device, data collection device or a remote device, for example. It should be understood that the terms "device" and "device" are meant to encompass any and all electronic devices and device types.

In one embodiment, an electronic device may be employed in conventional settings, such as, for example, inside buildings, homes, vehicles and finite spaces. In one embodiment, each device relies on its own PRU supplied with energy received from one or more common PTUs. In an embodiment utilizing a power usage module, the amount of energy contained within the energy storage device of each PRU, as well as the amount and rate at which energy is being withdrawn from the energy storage device, may be continuously or periodically monitored. The power usage module may be configured to activate a PRU communication signal requesting energy from a PTU in response to determining that the level of energy in the energy storage device is less than a predetermined level.

In one embodiment, a power unit controller in the PTU receives the PRU communication signal, determines that the signal is a request for wireless energy signal, and initiates a reference energy signal and one or more subsequent sequences of energy signals. For each subsequent sequence of power frequency transmission the PRU may provide a communication signal to the PTU when the power transmission is constructively aligned at the PRU (e.g., when the power received is increased due to adding the additional power transmission). By using this sequence of aligning power transmissions and direct feedback from the PRU, the location of the device requesting power, or more specifically, the location of the energy receptor of the device may be determined.

In one embodiment, the PRU continues to modify its feedback to the PTU including updating its power receipt level and, thus, updating the device location via the PRU communication signal as well as adjusting the PTU so that the transmitted power remains or recovers its constructive alignment at the appropriate energy receptor. When the device has received sufficient energy, the PRU terminates the communication, causing the PTU to cease power transmission.

In some embodiments, the power usage module tracks the energy received by the PRU. Energy reception data may be part of other data transmitted from the PRU through the communication signal transmitted to the PTU. The remote power system may be configured to terminate power transmission if the PRU fails to acknowledge the receipt of power from the PTU. This acts as a fail-safe should the power transmission be interrupted, moved or should the power transmission and energy receptor become misaligned.

In another embodiment, the PRU communication signal may transmit a data stream comprising any type of information to the PTU. In this way, each PRU may be uniquely identified so that a PTU receiving multiple communication signals can locate, track, and service an individual or multiple PRU(s) sequentially or concurrently.

In another embodiment, the PTU may also comprise a transmitter and a feedback module may comprise a receiver. When a communication signal is received by the PTU via the receiver, a PTU communication signal can be returned to the PRU via the PTU transmitter, establishing two-way communication between the PTU and the PRU. In this embodiment, transmission of the power may be predicated on establishment of two-way communication between the PTU and PRU.

In another embodiment, the invention comprises a new and improved wireless, including conductorless, power transmission system and method, which may be suitable for use in short range, finite environments.

In another embodiment, the invention comprises a system and method for receiving wireless energy and converting the received energy to a different form.

BRIEF DESCRIPTION OF THE DRAWINGS

These and other objects and features of the invention will become more apparent from the following description and appended claims taken in conjunction with the following drawings, wherein like reference numbers indicate identical or functionally similar elements.

DETAILED DESCRIPTION OF EMBODIMENTS OF THE INVENTION

The following is a detailed description of embodiments of the invention. However, the invention can be embodied in a multitude of different ways as defined by the claims. The invention is more general than the embodiments that are explicitly described, and accordingly, is not limited by the specific embodiments. The term "module," as used herein, means, but is not limited to, a software or hardware component, such as a field programmable gate array (FPGA) or an application specific integrated circuit (ASIC), which performs certain tasks. A module may advantageously be configured to reside on an addressable storage medium and to execute on one or more processors. Thus, a module may include, by way of example, components such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Figure 1A:
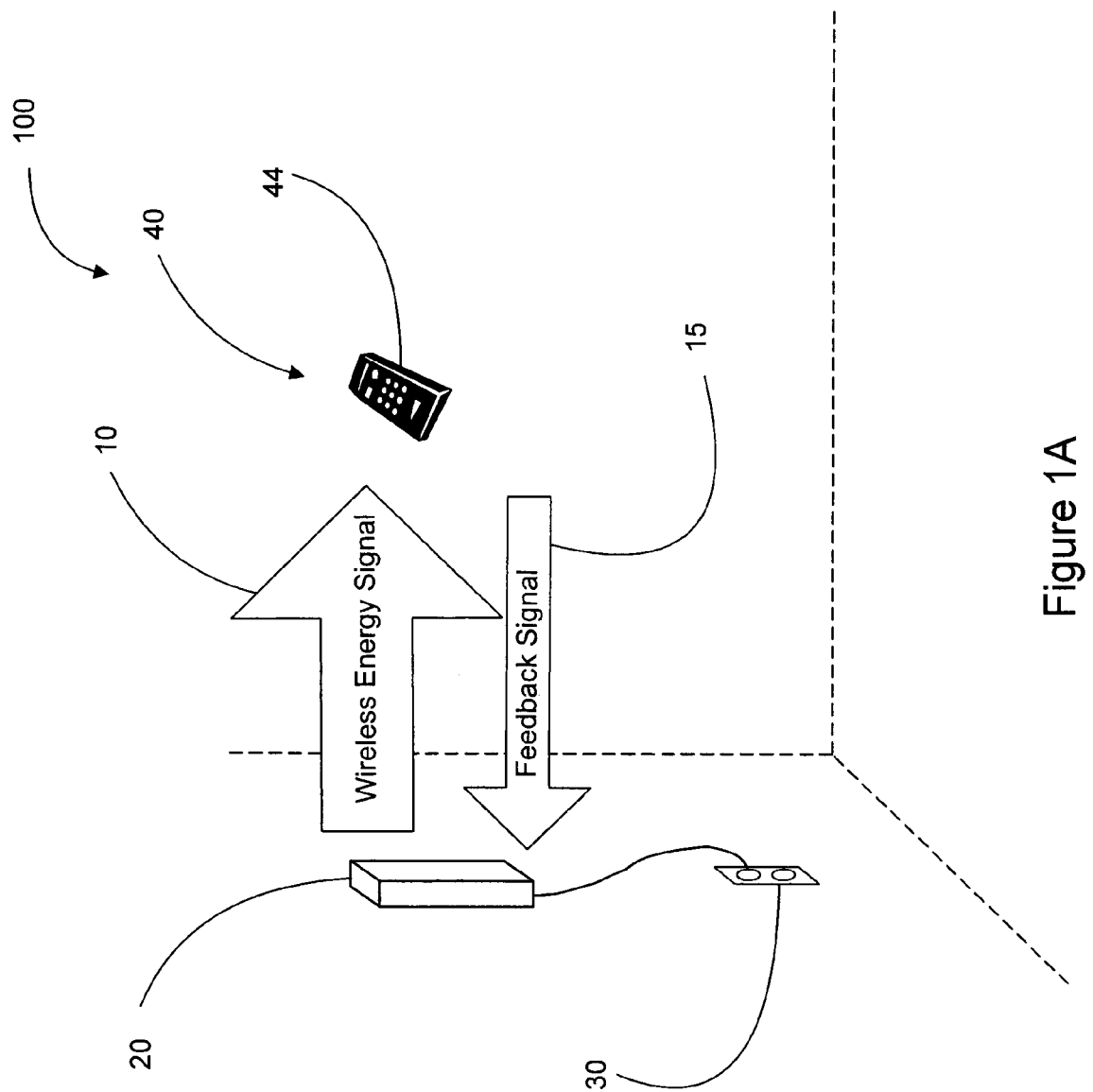
FIG. 1A is perspective view of an exemplary power transmitting unit and a power receiving unit illustrating one embodiment of system operation.

FIG. 1A is perspective view of an exemplary remote power system 100, including a power transmission unit (PTU) 20 and a power receiving unit (PRU) 44. The remote power system 100 will be broadly described herein in the context of power delivery to a "device" or an "electronic device". These terms, as used herein, are synonymous and should be broadly interpreted to encompass any device that runs on electricity or requires electric power.

As illustrated in FIG. 1A, the PTU 20 is coupled to a power source 30. In the exemplary embodiment of FIG. 1A, the power source 30 comprises a power grid that is accessed through a standard electrical outlet, such as those commonly found in residences and businesses alike. However, power source 30 may include other types of power sources, such as a power delivery system in vehicles, e.g., accessed through a cigarette lighter, or an in-seat power delivery system in an aircraft. The PTU 20 receives power from the power source 30 and is configured to transmit a wireless energy signal 10 to the PRU 44.

In FIG. 1A, the device 40, which includes the PRU 44, comprises a multimedia remote control. However, the device 40 may include any other electrical device, such as medical data recorders, cell phones, personal stereos, household devices, outdoor devices, security system sensors, weather data devices, pumping stations devices, electronic picture frames, portable computers, portable digital assistants, telephones, electronic game devices, data collection devices, data acquisition devices, and any other device that is powered by electrical energy. As illustrated in exemplary FIG. 1A, the device 40 is not physically coupled to the PTU 20 or the power source 30. Advantageously, the device 40 receives electrical charge wirelessly from the PTU 20 via the PRU 44.

In one embodiment, the PTU 20 may include a communication interface that couples the PTU 20 to a network, such as the Internet (World Wide Web) or any other communication system (cell phone, laptop, PDA, etc.). Similarly, the PRU 44 may include a communication interface that couples it to one or more data devices, such as a cell phone, laptop, or PDA, for example.

In operation, the PTU 20 transmits a wireless energy signal 10 to the PRU 44. In one embodiment, the wireless energy signal 10 comprises one or more energy signals transmitted at frequencies that are slightly above the audio band, such as in the range of 20 MHz to 40 MHz. In another embodiment, the wireless energy signal 10 comprises one or more energy signals transmitted at different phases and/or frequencies. In one embodiment, each of these energy signals is a power signal. Other frequencies of energy signals may be transmitted according to the systems and methods described herein. Thus, although frequencies above audio are discussed herein, these frequencies are exemplary and do not limit the range of frequencies that may be used to transmit power. In an advantageous embodiment, energy signals of multiple frequencies and/or phases are selected for transmission to a particular PRU 44 so that the multiple energy signals are constructively combined and an amount of power received (also referred to herein as a "power level") by the PRU 44 is increased.

In one embodiment, the PTU 20 broadcasts a broadly directional signal, such as an analog sine wave, that may be detected by the PRU 44. While this first signal is used to power the PRU 44, a second sine wave is transmitted at a different phase and/or frequency until the PRU 44 determines that the first and second sine wave signals constructively add at the physical location of the PRU 44. Additional signals, such as 2, 4, 6, 8, 10, 15, 20, or 40 signals, are then transmitted in this same manner, where each addition signal provides more power to the wireless energy signal 10 and decreases a charge time for the device coupled to the PRU 44.

The description below generally describes the transmission of multiple energy signals 11 (FIG. 1B) at different frequencies. However, the multiple energy signals 11 (FIG. 1B) comprising the wireless energy signal 10 may also be phase adjusted, so that a portion of the energy signals are transmitted at the same frequency, but at different phases. Accordingly, any references herein to adjustment of a frequency or a phase of an energy signal should be interpreted to include adjustment of a frequency or a phase of the energy signal, or a combination of a frequency and phase of the energy signal.

In one embodiment, the wireless energy signal 10 is transmitted in response to a request from the PRU 44. After receiving the wireless energy signal 10, the PRU 44 may then transmit a feedback signal 15 to the PTU 20, indicating a power level received. The PTU 20 may then transmit additional frequencies of energy signals to the PRU 44 in response to the received feedback signal. Thus, in one embodiment, power delivery to the PRU 44 is enhanced by transmitting multiple frequencies of energy signals in the wireless energy signal 10, wherein the frequencies are set based upon information in the feedback signal 15 indicating frequencies that are constructive.

Figure 1B:
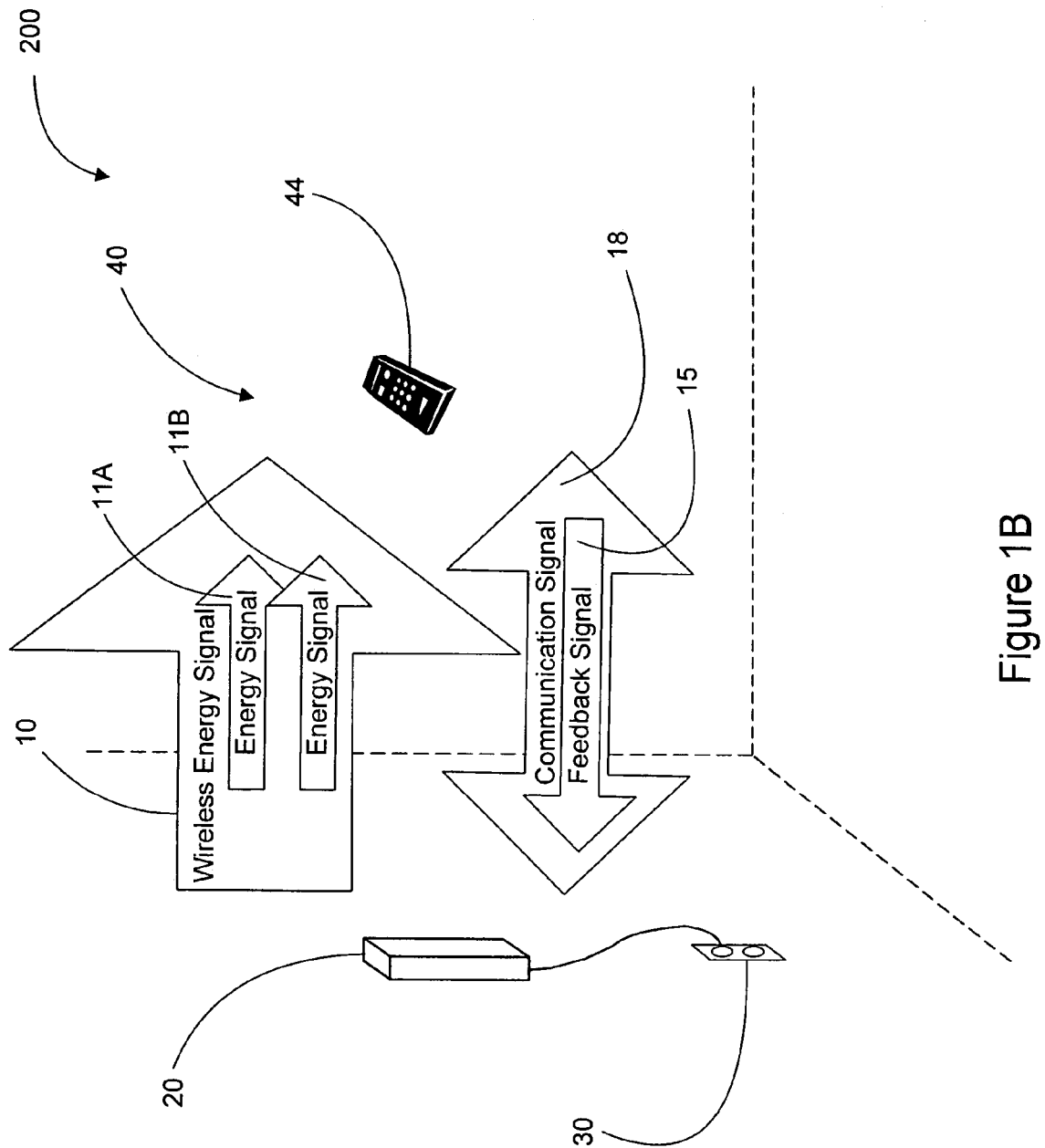
FIG. 1B is perspective view of the exemplary power transmitting unit and power receiving unit of FIG. 1A illustrating another embodiment of system operation.

FIG. 1B is another perspective view of the exemplary power transmitting unit and power receiving unit of FIG. 1A. As illustrated in exemplary FIG. 1B, the feedback signal 15 is a part of a bi-directional communication signal 18 transmitted between the PTU 20 and the PRU 44. Thus, in addition to transmitting power information from the device 40 to the PTU 20, the PTU 20 may transmit information to the PRU 44. In this way, the PTU 20 and the PRU 44 may be configured to bi-directionally communicate with one another. In one embodiment, a separate antenna is included in the PRU 44. In one embodiment that is described with reference to FIG. 2, this antenna is a part of a data communication module 58.

As illustrated in FIG. 1B, the wireless energy signal 10 comprises a first energy signal 11A and a second energy signal 11B. According to the methods described herein, these energy signal are selected to constructively combine in order to provide a power level to the device 40 that is greater that a power level of either the energy signals alone. In addition, any quantity of additional energy signals 11 may be added to the wireless energy signal 10 in order to increase a magnitude of the power level received at the device 40.

In one embodiment, the device 40 comprises a cell phone. For such devices, the density of the required wireless transmitted energy is approximately 20 watts/m$^2$. According to the systems and methods described herein, a communication signal to the cell phone may be configured to include both a wireless energy signal component and a communication signal component, thus providing an electrical charge to the phone battery while also providing voice data to the phone. In another embodiment, the PRU 44 is included in a laptop computer. The PRU 44 may be incorporated into the laptop itself or may be electrically connected to the laptop by an electrical cord, for example. In one embodiment, one or more PTU's 20 may be installed in a single device, or optionally in the walls and ceiling of a home or business structure.

Figure 2:
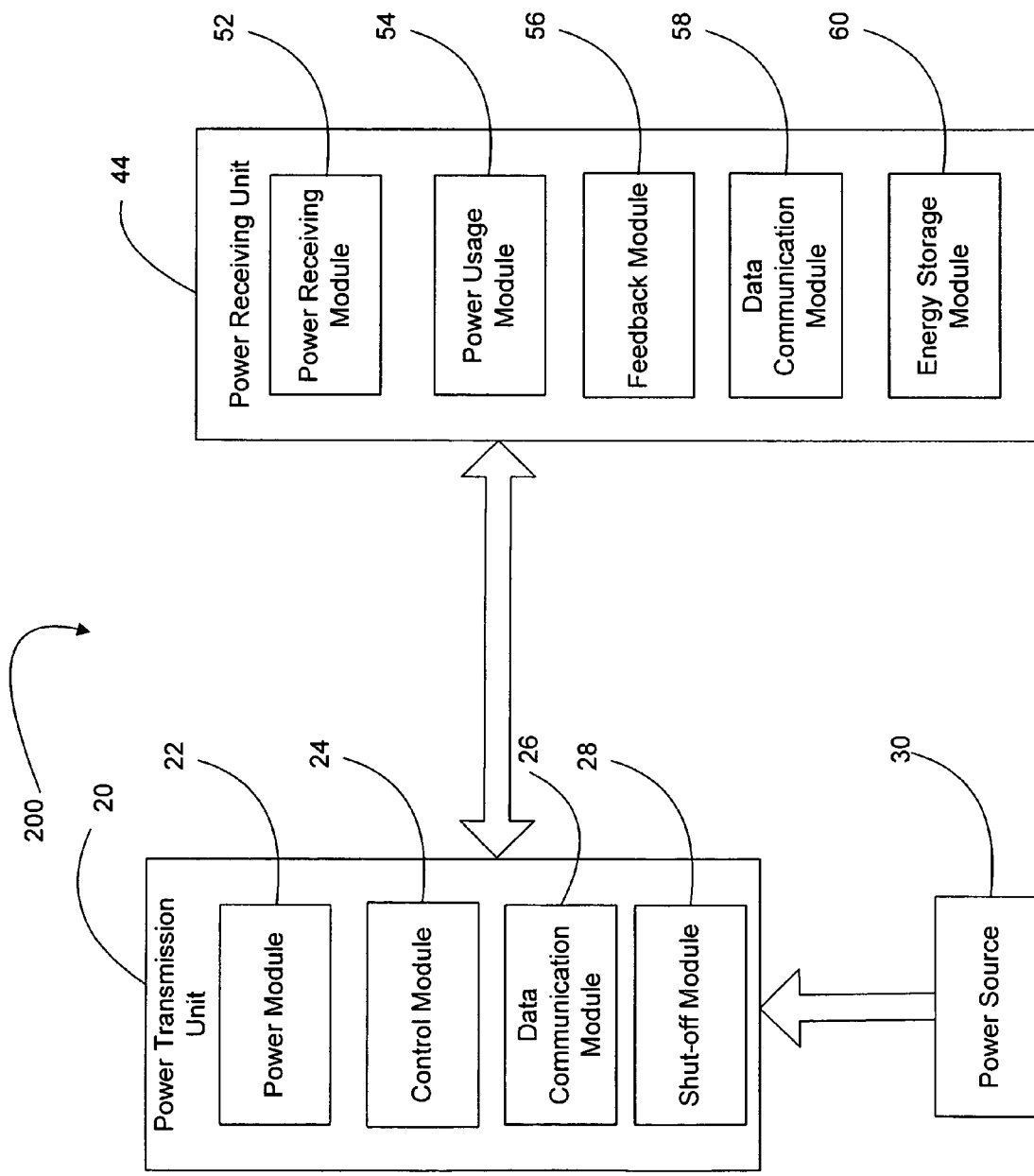
FIG. 2 is a block diagram of an exemplary wireless energy signal system.

FIG. 2 is a block diagram of an exemplary remote power system 200, including the PTU 20 and the PRU 44. In the embodiment of FIG. 2, the PTU 20 comprises a power module 22, a control module 24, a data communication module 26, and a shutoff module 28. The PTU 20 is coupled to the power source 30, which may be any type of power source. In the embodiment of FIG. 2, the PRU 44 includes a power receiving module 52, a power monitoring module 54, a feedback module 56, a data communication module 58, and an energy storage module 60. As indicated above, the PRU 44 may be manufactured along with each of multiple electronic devices, such that a PRU 44 is enclosed in a housing of each of the multiple electronic devices. In another embodiment the PRU 44 may be coupled to an existing electronic device, thus reducing the need for the electronic device 40 to be physically wired to a power source. Each of the exemplary modules illustrated in FIG. 2 will be described in further detail below.

The power module 22 comprises the power delivery components that are configured to transform and/or convert the power received from the power source 30 into one or more energy signals that may be transmitted to the PRU 44. Those of skill in the art will recognize that various components may be used in the power module 22 to transform and/or convert power from the power source 30. For instance, transmitted frequency in microwave energy form may be created using a magnetron, a klystron or a traveling-wave tube. Power may also be transmitted via much higher and lower frequencies of operation, such as those in the sub-audio band and those far above the frequencies of light. The systems and methods described herein expressly contemplate the use of any suitable components in the power module 22. The power module 22 is also configured to transmit one of four more frequencies of energy signals. In one embodiment, the control module 24 is coupled to the power module 22 and delivers instructions to the power module 22 indicating the specific one or more frequencies of energy signals to transmit. In another embodiment, the control module 24 delivers instructions to the power module 22 indicating the specific one or more phases of energy signals to transmit. In yet another embodiment, the control module 24 delivers instructions to the power module 22 indicating the specific phases and frequencies of multiple energy signals to transmit.

The wireless energy signal 10 may take the form of bursts or small packets of energy. In this way, each short burst of energy via the wireless energy signal 10 can be acknowledged by the feedback module 56 (described in further detail below) of the PRU 44 to ensure a safe transfer of energy. In one embodiment, without proper acknowledgment for each burst of energy, the PTU 20 will not transmit additional bursts of energy. In one embodiment, if acknowledgment has not been received within a predetermined time period, the communication signal 18 is terminated and must be reestablished in order for the PRU 44 to begin receiving the wireless energy signal 10.

In one embodiment, the PTU 20 may incorporate a PRU, and be supplied with energy remotely from another PTU. This arrangement may be employed, for example, in larger or more complex environment where power grid connections are not readily available. Thus, a device housing both a PRU and PTU may serve as an energy repeater, receiving and transmitting energy signals, so that energy may be transmitted further distances. In one embodiment, multiple energy repeaters, e.g., devices comprising both a PRU and PTU, may be positioned to transfer a wireless energy signal 10.

In the embodiment of FIG. 2, the PRU 20 comprises a data communication module 26 that is configured to communicate with the PRU 44. For example, the data communication module 26 may communicate energy signal frequency information to the PRU 44. In one embodiment, the PTU 20 and the PRU 44 establish a two way communication, wherein information of any type may be exchanged between the two devices. Thus, the data communication module 26 may include both a transmitter and receiver configured to communicate with the PRU 44. In one embodiment, the communication frequency and protocol used by the data communication module 26 is standardized so that any PRU 44 may establish a communication link with the PTU 20.

The control module 24 illustrated in FIG. 2 is configured to determine the characteristics of one or more energy signals 11 (FIG. 1B) to transmit to the PRU 44. In one embodiment, the control module 24 is in data communication with the data communication module 26 so that the feedback signal 15 received by the data communication module 26 may be used in determining one or more appropriate energy signal 11 for transmission to the PRU 44. The control module 24 may include a microprocessor, or other logic device, for analyzing the feedback signal 15 received from the PRU 44 and determining appropriate adjustments to the transmitted energy signals 11.

In one embodiment, the control module 24 may also determine which of the data signals received via the communication signal 18 are requests for power transmission. In some embodiments, the control module 24 additionally acknowledges the power transmission request via the communication signal 18 prior to initiating transmission of the wireless energy signal 10. In this embodiment, the acknowledgement signal may include calibration information for the PRU 44, such as an initial frequency for transmission of the wireless energy signal 10. After a communications link has been established between the PRU 44 and the PTU 20, the communication signal 18 may be augmented and/or replaced by the wireless energy signal 10.

In the embodiment of FIG. 2, the PRU 44 comprises a power receiving module that is configured to receive the wireless energy signal 10, comprising one or more energy signals 11, and convert the received wireless energy signal 10 to an energy form that is usable by the electronic device 40. The power receiving module 52 may include, for example, an energy receptor and an energy converter. The power receiving module 52 typically comprises an antenna configured to receive power within a predetermined frequency range. However, the power receiving module 52 may include any other components that are capable of receiving power transmitted wirelessly from the PTU 20. Thus, the power receiving module 52 receives the one or more frequencies of energy signals 11 transmitted from the PTU 20 and converts the received energy signals 11 to a form that is usable by the electronic device 40 to which the PRU 44 is operably coupled. Those of skill in the art will recognize that various components may be used in the power receiving module 52 to receive and/or convert received energy signals.

The exemplary PRU 44 also includes the feedback module 56, which is configured to monitor the power received by the power receiving module 52 and determine an appropriate feedback signal 15 for transmission to the PTU 20. In one embodiment, the feedback module 56 periodically determines if the power level of the received wireless energy signal 10 has increased and, in response to determining that the power level has increased, initiates communication of a data signal to the PTU 20 via the data communication module 58. In another embodiment, the PTU 20 and the PRU 44 are in communication, via the communication signal 18, regarding timing of transmission of additional energy signals at various frequencies. In this embodiment, the feedback module 56 may transmit a power level indication to the PTU after each energy signal 11 at their respective frequencies is added to the wireless energy signal 10. The PTU may use the data received from the feedback module 56 to determine if a particular frequency energy signal 11 has constructively added to the existing wireless energy signal 10 and if additional frequencies should also be transmitted.

In one embodiment, the PRU 44 also comprises the data communication module 58, which is configured to initiate broadcast of a PRU communication signal to the PTU 20. In one embodiment, the data communication module 58 is selectively activated by the feedback module 56, for example, when additional power is required by the electronic device 40. Thus, the data communication module 58 may not require any power until the energy storage module 60, or another power storage devices in the electronic device 40, indicates that charging is necessary. For example, the data communication module 58 may be configured to automatically send a communication signal to the PTU 20 requesting power delivery to the PRU 44 when power is needed. Thus, the device 40 may be charged by wireless power delivery without human intervention, reducing or eliminating the need to remember to plug in the device 40 for charging.

In one embodiment, the data communication module 58 has two modes of operation. The first is a general communication mode that transmits an omni-directional signal around the device 40, or some portion to either side of the device, to search for a PTU 20. If multiple PTUs are detected, the PRU 44 may select the strongest signal. Once a particular PTU 20 is chosen, the data communication module 58 changes from the general communication mode to a directional mode to provide a constructive feedback signal with limited or controlled dispersion for the PTU 20 to follow.

In one embodiment, the PTU 20 locks onto and tracks the feedback signal 15 from the PRU 44. In one embodiment, the feedback signal 15 may be sent from an antenna that is coaxially located with the power receiving module 52, thereby allowing the PTU 20 to determine a more exact location of the power receiving module 52, if desired.

Once the PTU 20 has located and determined the source of the feedback signal 15, the control module 24 of the PTU 20 may adjust the wireless energy signal 10 to align multiple frequencies of energy signals 11 on the power receiving module 52, and more particularly on a power receptor portion of the power receiving module 52. Once aligned, the power module 22 may maintain transmission of one or more frequencies of energy signals 11 to the PRU 44. Maintaining the transmission of one or more frequencies of energy signals 11 may comprise adjusting the phase and/or frequency on one or more of the energy signals 11 so that the energy signals 11 are constructively combined at the physical location of the PRU 44.

In one embodiment, the communication signal 18 from the PTU 20 to the PRU 44 is included as part of the transmission of the wireless energy signal 10. In this embodiment, the PRU 44 may include only a transmitter for the communication signal 18 because the incoming data communication signal 18 may be received by the power receiving module 52. In an embodiment where data is communicated via the wireless energy signal 10, the PTU 20 may include components for encoding data into the wireless energy signal 10 and the PRU 44 may include components for decoding the data from the wireless energy signal 10. For example, the PTU 20 may include a combination power transmitter/communication module configured to encode data into the wireless energy signal 10 and the PRU 44 may include an energy signal communication interpreter configured to decode data carried by the wireless energy signal 10. Those of skill in the art will recognize that various other methods for transmitting multiple data and energy signals are possible, each of which is contemplated for use with the systems and methods described herein.

One function of a the communication signal 18 between the PTU 20 and the PRU 44 is to allow the PRU 44 to request power from the PTU 20 and to permit identification of the PRU 44 to data gathering companies for transaction purposes. For example, obtaining an electrical charge from the PTU 20 may require payment of a monetary fee. Thus, each PRU 44 may be associated with an identification code, such as an ID number, that is transmitted to the PTU 20 when the PRU 44 requests an electrical charge. In one embodiment, the PTU 20 securely indexes the PRU 44 identification code to a payment source and provides usage information to a billing device configured to bill the payment source. In one embodiment, the PRU 44 registers with the PTU 20 by transmitting payment information to the PTU 20 prior to receiving the wireless energy signal 10 from the PRU 20.

In one embodiment, the communication signal 18 also allows the PTU 20 to serve as a communications pathway between the device 40 and other systems, such as the Internet or telephone networks. For example, in one embodiment the PTU 20 is coupled to the Internet so that the device 40 is also coupled to the Internet by means of the communications signal 18. Accordingly, the PTU 20 may be used to transmit data from the Internet to the device 40.

In one embodiment, the communication signal 18 comprises a digital data stream configured to accurately transfer large amounts of digital data at high speed. The use of a digital data stream may allow the device 40 to transmit other information, such as, for example, the amount of power received and the status and condition of the device 40, for example. Two-way communications may also allow communication with the device 40 for providing instructions regarding the rate of data sampling and data format, for example. The digital data stream may be in the form of a coded or encrypted communication signal, to provide a secure communication between the PRU 44 and PTU 20, thereby reducing a risk of signal or power theft. In one embodiment each device 40 communicating with the PTU 20 may be identified by data transmitted to the PTU 20 via the communication signal 18. The PTU 20 may then assign a priority to each device 40 that may be used to prioritize transmission of the wireless energy signal 10 at frequencies preferred by the various devices 40. For example, high priority devices 40 may be given ultimate priority to preferentially receive any available wireless energy signal 10.

In one embodiment, the wireless energy signal 10 is absorbed by the power receiving module 52 and transformed to a form compatible with the energy storage module 60. This conversion may be accomplished by the power receiving module 52 or by a separate energy conversion module (not shown). For many electronic devices, the energy storage module 60 includes a battery. In other embodiments, the energy storage module 60 may comprise, for example, a flywheel, an ultra-capacitor, a fuel cell, or any other energy storage device known in the art. The energy stored in the energy storage module 60 is used to power the various components of the device 40.

In the embodiment of FIG. 2, the exemplary PRU 44 also includes the power usage module 54, which is a logic device configured to control power management inside the PRU 44 and/or the device 40. The power usage module 54 may be configured to monitor the amount of energy available to the device 40 from the energy storage module 60, which may comprise a rechargeable battery, for example. In one embodiment, the power usage module 54 also monitors the energy used by the device 40 and the energy received from the PTU 20. In one embodiment, when the energy available to the device 40 falls below a predetermined level, the power usage module 54 may activate a data communication module 58 (described below) to request additional power from a PTU.

In one embodiment, the power usage module 54 is configured to initiate termination or altering of the wireless energy signal 10 when the level of energy in the energy storage module 60 rises above a predetermined level. For example, if the power usage module 54 determines that a battery in the energy storage module 60 has reached it's full charge, the power usage module 54 may initiate transmission of a data signal to the PTU 20 via the data communication module 58. The data communication module 26 of the PTU 20 may receive this signal and communicate the received information to the control module 24, which may then terminate transmission of the wireless energy signal 10.

In one embodiment, if the feedback signal 15, or other portion of the communication signal 18, is not received by the PTU 20, or if the wireless energy signal 10 is not received by the PRU 44, all communication between the PTU 20 and PRU 44 are terminated. Accordingly, in this embodiment, after termination of communications between the PTU 20 and the PRU 44, a new communication link may be established between the devices in order to resume energy transmission.

Any modules illustrated as part of the PTU 20 and the PRU 44 may be combined or further divided into separate modules.

Safety

Safety devices may be added to different embodiments of the PTU 20. For example, the shutoff module 28 of the PTU 20 may comprise a motion or position sensitive switch configured to initiate deactivation of the power module 22 when the PTU 20 is jarred or moved out of position, thus disabling the power module 22 before the wireless energy signal 10 can cause damage or injury. In another embodiment, acknowledgment of receipt of the wireless energy signal 10 by the PRU 44 may be accomplished through the use of a two-way fuse located near the PTU 20. In one embodiment, the two-way fuse is activated by the wireless energy signal 10 from the power transmitter PTU 20 and deactivated by an acknowledgment signal received by the PTU 20 via the communication signal 18. When the wireless energy signal 10 is not acknowledged as received, the two way fuse activates the shutoff module 28, which is configured to disable the power module 22. The shutoff module 28 can be a mechanical switch, a disposable electrical connection or other known devices. The power module 22 may be disabled for a predetermined period of time, after which time the two-way fuse may automatically reactivate and allow the power module 22 to begin transmission of the wireless energy signal 10. In one embodiment, multiple two-way fuse deactivations within a predetermined time period may permanently deactivate the power module 22, requiring manual replacement or resetting of the two-way fuse.

In an embodiment where the power module 10 continuously transmits the wireless energy signal 10, the shutoff module 28 may be activated by transmission of at least a predetermined amount of energy and deactivated by reception of at least a predetermined amount of energy. In this embodiment, when the amount of energy transmitted is greater by a predetermined amount than the amount of energy acknowledged as received, the shutoff module 28, including a two-way fuse, for example, initiates deactivation of the power module 22.

In another embodiment, the shutoff module 28 comprises a piezoelectric element. In this embodiment, after the communication signal 18 has been established between the PRU 44 and the PTU 20, the power module 22 sends a wireless energy signal 10 including an energy signal at a first frequency to the power receiving module 52, deflecting a counter coupled to the piezoelectric element one increment toward activating the shutoff device. The device 40 receives the energy signal at the first frequency, converts the energy signal to a usable energy form, and stores the energy in the energy storage module 60. The PRU 44 acknowledges receipt of the energy signal at the first frequency and requests another energy signal at a second frequency, via the communication signal 15, for example. The acknowledgement of the energy signal at the first frequency is received by the PTU 20 and deflects the counter coupled to the piezoelectric element back one increment away from initiating deactivation of the power module 22 by the shutoff module 28. Thus, so long as an acknowledgement signal is transmitted to the PTU 20 for each energy signal sent to the PRU 44, the shutoff module 28 will not deactivate the power module 22. The shutoff module 28 may be configured to activate, thus disabling transmission of the wireless energy signal to a particular device 40, when the counter reaches a predetermined threshold. Accordingly, deflection of the piezoelectric element can be designed to initiate termination of the wireless energy signal 10 before a dangerous number of transmitted energy pulses are transmitted.

Another safety device that can be incorporated into the PTU 20 is a pathway sensor mounted in the transmission path of the wireless energy signal 10, such as in a channel or conduit of the PTU 20, for example. The pathway sensor may be configured to shut down the PTU 20 prior to any abnormally high levels of energy leaving the PTU 20. In one embodiment, the pathway sensor comprises a heat sensitive sensor element. In operation, a portion of the wireless energy signal 10 strikes the sensor element and a small portion of the transmitted energy is absorbed, causing heating of the sensor element. In one embodiment, less than about 0.1% of the transmitted energy is absorbed by the pathway sensor. The heat absorbed by the pathway sensor may be removed by an external cooling source, such as, for example, an air channel or thermoelectric cooling device, that is activated in response to receiving the feedback signal 15 at the PTU 20. Thus, so long as the feedback signal 15 continues to be received at the PTU 20, the cooling source will remain activated and heat absorbed from the wireless energy signal 10 will be removed from the sensor element. However, if a predetermined number of energy signals 11 of the wireless energy signal 10 strike the sensor element without cooling, the sensor element will overheat and "burn out", (e.g., break), thereby initiating termination of the wireless energy signal 10. In this embodiment, the sensor element would need to be replaced before the PTU 20 could resume transmission of the wireless energy signal 10.

In one embodiment, the PRU 44 comprises a security zone enveloping the region around and/or above at least the power receiving module 52. This security zone may be activated by motion sensors, for example, which may be configured to initiate transmission of a termination signal to the PTU 20 in response to detecting movement within the determined security zone. Security zone techniques are well known and used in detection systems in homes, around automated machinery in manufacturing facilities, security systems in museums, prisons, and banks, for example. Thus, those of skill in the art will recognize that many types of sensors, in various configurations, may be implemented in order to trigger upon movement of an object, such as a human hand, into the security zone.

In one embodiment, the feedback module 56 includes two transmitters for transmitting the feedback signal 15. In this embodiment, a first transmitter is positioned near the power receiving module 52 and the other transmitter is positioned in another portion of the PRU 44. The feedback signal 15 may be transmitted in rotation, simultaneously or variably (sequential, continuous, intermittent, for example) from the multiple transmitters. The transmitters may be configured to create a security zone around at least the power receiving module 52 of the PRU 44. More particularly, if an object crosses into the transmission path of one of the transmitters, such that the PTU 20 only receives signals from the other transmitter, the shutoff module 28 of the PTU 20 may be configured to terminate transmission of the wireless energy signal 10.

Those of skill in the art will recognize that the above-described security devices may be used in various other configurations. In addition, other safety devices may be used in conjunction with the PTU 20 and/or the PRU 44.

Figure 3:
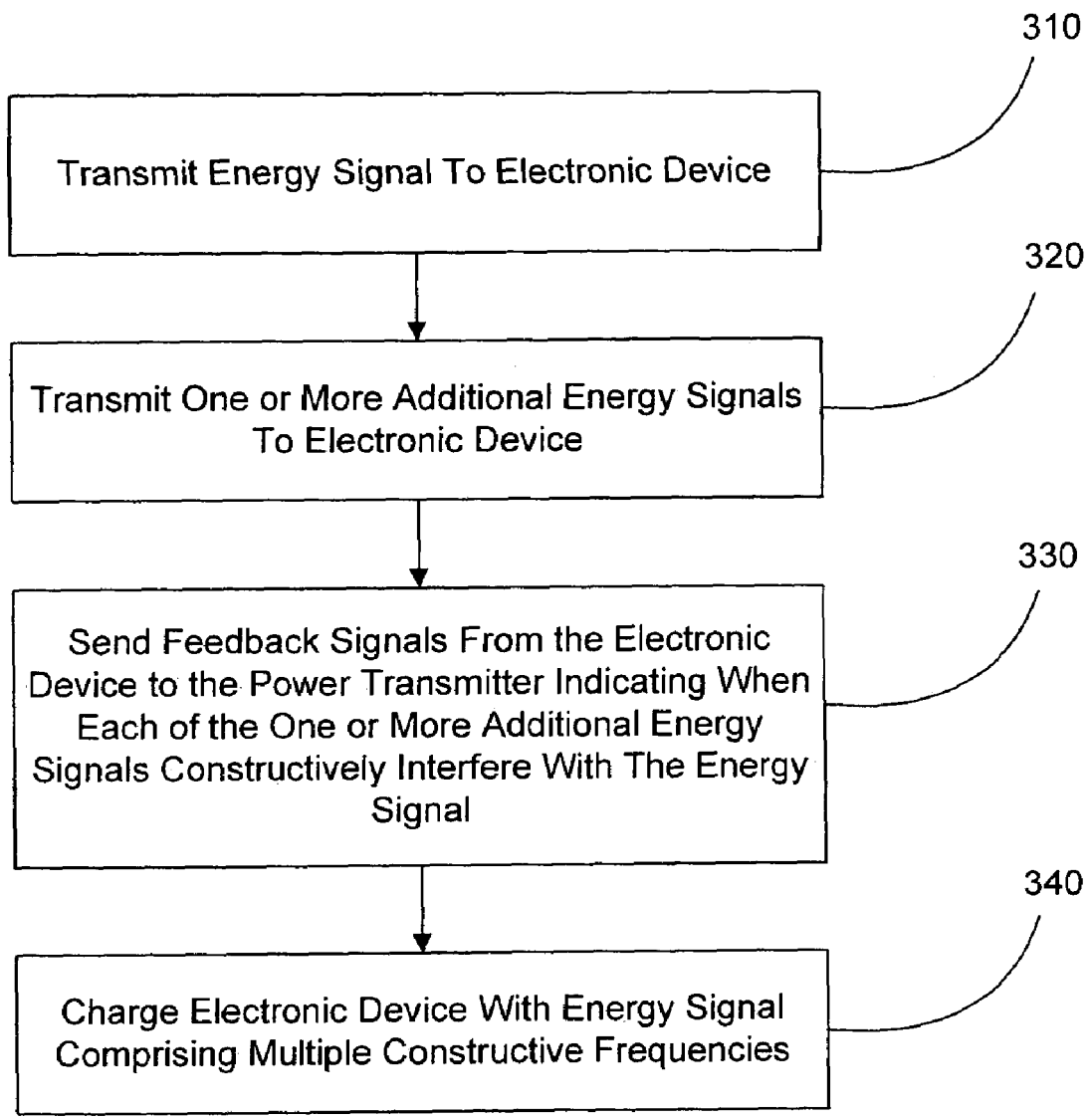
FIG. 3 is a flow chart illustrating an exemplary method of charging an electronic device.

FIG. 3 is a flow chart illustrating an exemplary method for charging an electronic device, such as the electronic device 40, via the PRU 44. In one embodiment, the method that is described with respect to FIG. 3 may be performed by the PTU 20 and PRU 44, for example. For ease of description, the method of FIGS. 3, 4, and 5 will be described with reference to components illustrated in exemplary FIGS. 1A, 1B, and 2. However, other configurations of PTUs and PRUs may be used in accordance with this method.

Starting at a block 310, an energy signal is transmitted to the electronic device 40 or, more specifically, to the PRU 44. For example, the energy signal 11A (FIG. 1B) may be transmitted. As discussed above, the electronic device may be any type of device that is powered by an electrical signal, such as, for example, a computer, a PDA, or a remote control.

Next, in a block 320, one or more additional energy signals 11B-11N are transmitted to the PRU 44. As described in detail above, the PRU 44 and the PTU 20 are in data communication so that the PRU 44 may provide feedback to the PTU 20 indicating which of the one or more additional energy signals 11B-11N increases a power level of a combined energy signal, also referred to as the wireless energy signal 10. In an advantageous embodiment, the one or more additional energy signals 11B-11N constructively combine with the energy signal 11A that is transmitted in block 310, thereby increasing a power level of the wireless energy signal. In one embodiment, each of the one or more additional energy signals 11B-11N is transmitted at a different phase and/or frequency, wherein each of the different frequencies are above the audio band frequencies. In other embodiments, the transmission frequencies of the energy signals may be selected from any suitable frequency range. In one embodiment, for example, additional energy signals 11B-11E may be transmitted at the same frequency as energy signal 11A, but each at different phases, and energy signals 11B-11N may be transmitted at different frequencies than energy signal 11A.

Moving to a block 330, the PRU 44 transmits one or more feedback signals to the PTU 20 indicating when each of the one or more additional energy signals 11B-11N constructively interferes with the wireless energy signal 11A. In one embodiment, after each of the one or more additional energy signals 11B-11N is transmitted, the PRU 44 transmits a feedback signal to the PTU 20, indicating a received power level from the wireless energy signal 10. The PTU 20 may then interpret the received feedback signal in order to determine if each of the additional energy signals 11B-11N constructively combined with the other energy signal 11 of the wireless energy signal 10. If a particular additional energy signal 11X (not shown) does not constructively combine with the other energy signals 11 comprising the wireless energy signal 10, the PTU 20 may be configured to change the frequency of the particular additional energy signal 11X and resend the particular additional energy signal 11X. In response to the resent additional energy signal 11X, the PRU 44 may be configured to again transmit a feedback signal to the PTU 20. Thus, the PTU 20 may cycle through multiple frequencies for the energy signal 11X before locating a frequency that constructively combines with the other energy signals 11 in the wireless energy signal 10, as indicated by the feedback signal from the PRU 44.

Continuing to a block 340, the electronic device 40 is charged by the wireless energy signal 10 comprising multiple constructive frequencies of energy signals 11. Because the wireless energy signal 10 is a constructive combination of multiple frequencies of energy signals 11, the power wirelessly delivered to the electronic device 40 is maximized. The received wireless energy signal 10 may be converted by the PRU 44 and/or the electronic device 40 to another form that is suitable for storage in an energy storage module 60, such as a battery.

Figure 4:
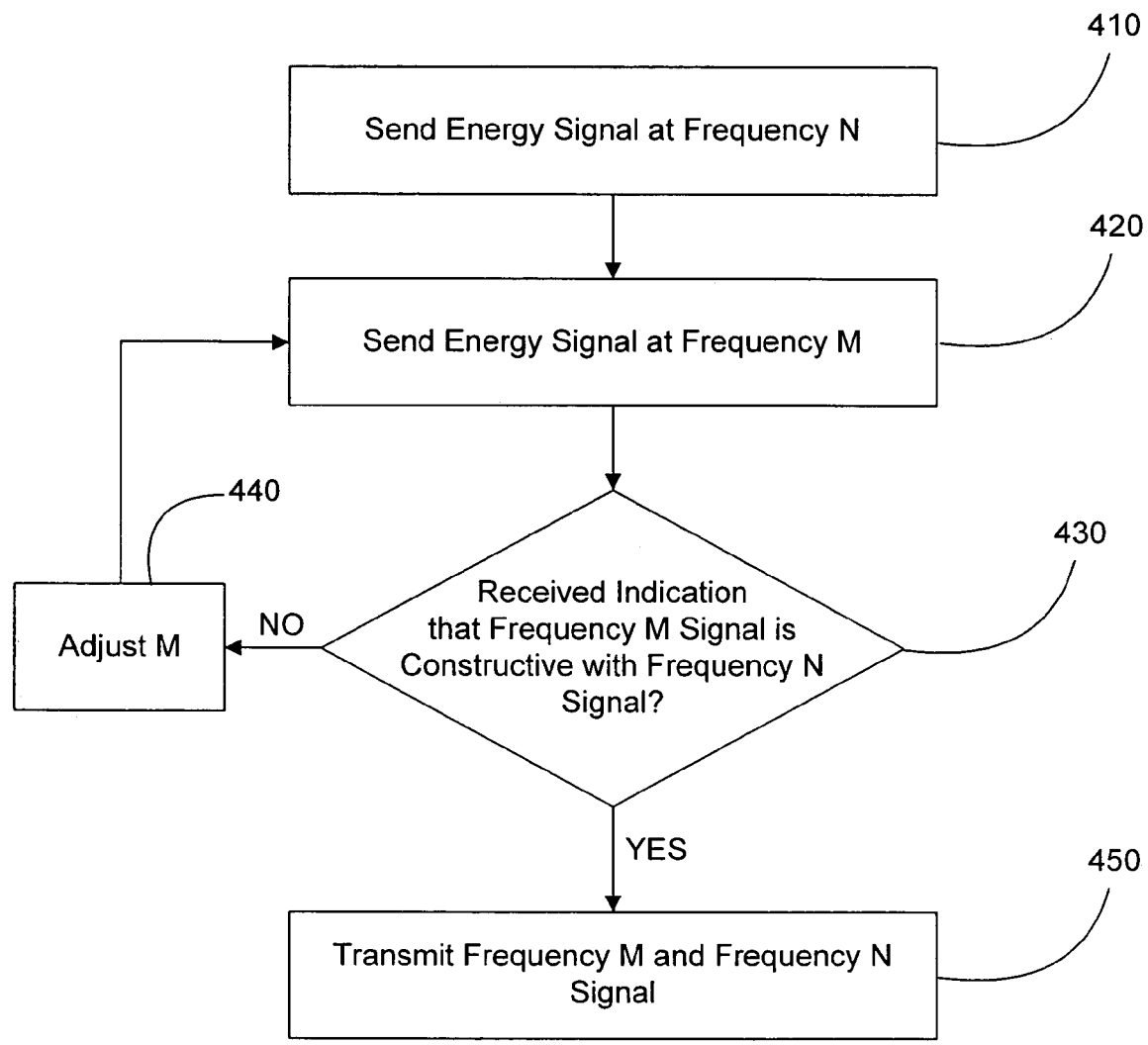
FIG. 4 is a flow chart illustrating an exemplary method of transmitting a wiresless power transmission that may be performed by a power transmission unit.

FIG. 4 is a flow chart illustrating an exemplary method of transmitting the wireless energy signal 10, which may be performed by the exemplary PTU 20. The method may be performed by other devices, such as a computing device coupled to a power source, for example.

In a block 410, a first energy signal 11A is transmitted at frequency N. This frequency N energy signal 11A is at least a portion of the wireless energy signal 10. As described herein, the wireless energy signal 10 may include multiple frequencies of energy signals 11. In one embodiment, frequency N is a predetermined frequency that is used by electronic devices and PRU's 44. Accordingly, those PRU's 44 that wish to receive the wireless energy signal 10 may be tuned to receive the energy signal 11A at frequency N.

Moving to a block 420, a second energy signal 11B is transmitted at frequency M. For example, if frequency N is 40 Mhz, frequency M maybe 40.001 Mhz.

Continuing to a decision block 430, the PTU 20 determines if an indication that the energy signal 11B is constructive with the energy signal 11A. As described above, this determination may be made based on a feedback signal 15 received from the PRU 44. In one embodiment, the feedback signal 15 from the PRU 44 is transmitted to the PTU 20 via a communication channel that is established at a predetermined frequency and using a predetermined communication protocol. If the PTU 20 determines that no indication of constructive interference has been received, the method continues to a block 440 where the value of M is changed. However, if the PTU 20 determines that an indication of constructive interference has been received from the PRU 44, the method moves to a block 450 where the energy signals 11A and 11B continue to be transmitted to the PRU 44.

In block 440, the value of M is adjusted so that the subsequently transmitted energy signal 11B is transmitted at a different frequency. In one embodiment, M is incremented by a predetermined amount. For example, if the range of energy signals spans from 40 MHz to 42 MHz, M may begin at 42.001 MHz and may be changed in increments of 1 KHz (0.001 MHz) at block 440. In another embodiment, M is decremented by a predetermined amount in block 440. After adjusting M in block 440, the method returns to block 420, where the PTU 20 transmits the energy signal 11B at the adjusted frequency M. In this way, multiple frequencies within a range of frequencies may be sequentially transmitted to the PRU 44 until an indication is received that the energy signal 11B has constructively combined with the concurrently transmitted energy signal 11A.

In response to receiving an indication that the energy signal 11B is constructive with the energy signal 11A, in a block 450, the PTU 20 continues to transmit the frequency M and the frequency N energy signals. Accordingly, the wireless energy signal comprises energy signals at both frequencies M and N, which constructively combine to deliver more power to the PRU 44 than could be delivered through the single frequency N energy signal.

The method of FIG. 4 may be repeated beginning at block 420, wherein an additional energy signal 11, such as energy signals 11C-11N, may be transmitted to the PRU 44. In this way, the method is not limited to a specific number of transmitted energy signals 11. In fact, the wireless energy signal 10 may comprise any number of energy signals 11. In one embodiment, the energy signals 11B-11N may be transmitted at different phases than the energy signals 11A. Thus, a range of phases for each signal may be transmitted until the energy signal is constructively combined with the energy signal 11A. In another embodiment, a portion of the additional energy signals 11 may be transmitted at frequency N, but at different phases than energy signal 11A, while another portion of the additional energy signals 11 are not transmitted at frequency N, but are transmitted in phase with energy signal 11A. In addition, other characteristics of the additional energy signals 11B-11N may be adjusted so that the energy signals constructively combine with the energy signal 11A.

Figure 5:
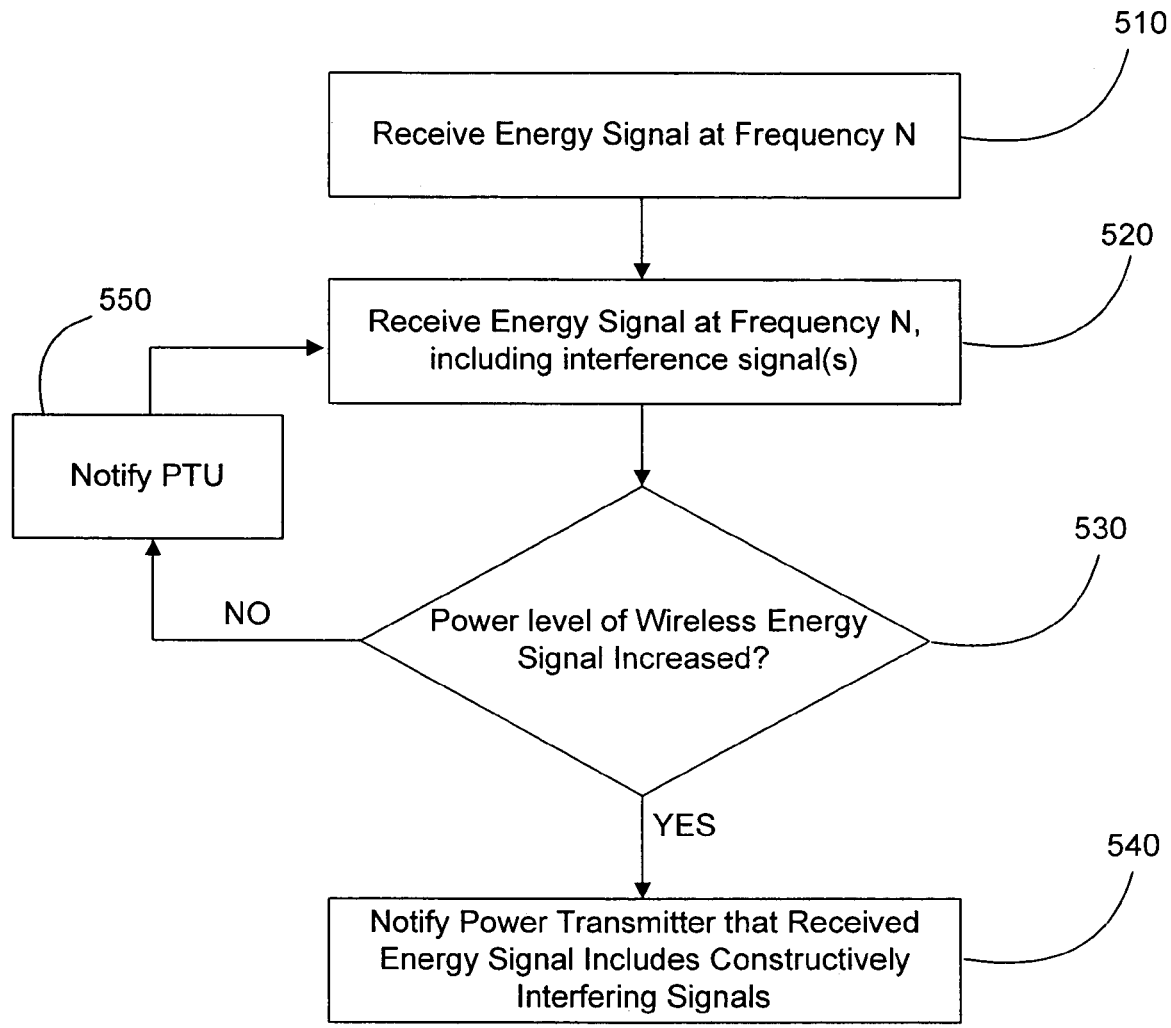
FIG. 5 is a flow chart illustrating an exemplary method of receiving a wireless energy signal that may be performed by a power receiving unit.

FIG. 5 is a flow chart illustrating an exemplary method of receiving a wireless energy signal 10 which may be performed by a power receiving unit, such as the PRU 44 of FIGS. 1, 2, and 3.

In a block 5 10, the frequency N energy signal 11A is received by the PRU 44. As described above, N may be set to a predetermined frequency that is used by electronic devices and PRU's 44.

Continuing to a block 520, the frequency N energy signal 11A is again received, in combination with one or more additional energy signals 11 at other frequencies. As described above with respect to FIG. 4, the PTU 20 may add additional energy signals 11 to the wireless energy signal 10 in order to increase a power capacity of the wireless energy signal 10.

Moving to a decision block 530, the PRU 44 determines if a power level of the wireless energy signal 10 has increased. Thus, the PRU 44 determines if the received one or more additional energy signals have constructively combined with the frequency N energy signal 11A. If the PRU 44 determines that the power level of the wireless energy signal 10 has not increased, the method continues to a block 550, wherein the PTU 20 is notified that the one or more additional energy signals 11 have not constructively combined with the frequency N energy signal 11A. As described above, the PRU 44 may transmit a feedback signal to the PTU 20 indicating whether the power level of the wireless energy signal 10 has increased, or, alternatively, indicating a power level of the wireless energy signal 10 at the PRU 44.

After notifying the PTU 20 that the power level of the wireless energy signal 10 has not increased, the method returns to block 520, where the frequency N energy signal 11A, in combination with one or more additional energy signals 11 are received. As discussed above with respect to FIG. 4, a frequency of the one or more additional energy signals 11 may periodically be changed, in response to the received notification transmitted at block 550, or at predetermined time intervals, for example. Accordingly, the method repeats blocks 520, 530, and 550, until the additional one or more energy signals 11 constructively combine with the other energy signals 11 in the wireless energy signal 10.

In response to determining that the power level of the wireless energy signal 10 has increased in block 530, the method continues to a block 540, where the PRU 44 notifies the PTU 20 that the wireless energy signal 10 includes constructively interfering energy signals 11. Again, the PRU 44 may communicate this information via a feedback signal 15 that uses a predetermined frequency and is transmitted according to a predetermined communication protocol.

In one embodiment, after notifying the PTU 20 of the constructively interfering signals, the method returns to a block 520, where additional energy signals 11 are received in the wireless energy signal 10, in combination with the frequency N energy signal 11A and one or more additional energy signals 11 that have already been determined to constructively combine with the frequency N energy signal 11A. In this way, more than one additional frequency of energy signal 11 may be combined in the wireless energy signal 10 in order to further increase a power delivery capacity of the wireless energy signal 10.

As described above, the system described above performs a method of increasing a power capacity of a wireless energy signal 10 by transmitting energy signals 11 of different constructive frequencies to the PRU 44.

Specific parts, shapes, materials, functions and modules have been set forth, herein. However, a skilled technologist will realize that there are many ways to fabricate the system of the present invention, and that there are many parts, components, modules or functions that may be substituted for those listed above. While the above detailed description has shown, described, and pointed out the fundamental novel features of the invention as applied to various embodiments, it will be understood that various omissions, substitutions, and changes in the form and details of the components illustrated may be made by those skilled in the art, without departing from the spirit or essential characteristics of the invention.

What is claimed is:

1. A method of providing electrical power to an electronic device, the method comprising:
    transmitting a first energy signal to the electronic device;
    transmitting one or more additional energy signals to the electronic device, wherein each of the one or more additional energy signals is transmitted at a frequency that is different than the first energy signal; and
    transmitting a feedback signal from the electronic device indicating whether the one or more additional energy signals constructively interferes with the first energy signal.

2. The method of claim 1, wherein the first energy signal provides electrical power to the electronic device.

3. The method of claim 1, wherein the first energy signal and the one or more additional energy signals provide electrical power to the electronic device.

4. A system for providing electrical power to an electronic device, the system comprising:
    a power transmission unit configured to transmit one or more frequencies of a energy signal;
    a power receiving module configured to receive the one or more frequencies of the energy signal;
    a feedback module configured to transmit a feedback signal to the power transmission unit indicating a level of constructive interference in the received one or more frequencies of the energy signal.

5. The system of claim 4, wherein the power transmission unit is configured to receive the feedback signal and adjust a frequency of one of the one or more frequencies of energy signals in response to the feedback signal.

6. A method of transmitting a wireless energy signal from a power transmission unit, the method comprising:
    (a) transmitting a first frequency energy signal and a second frequency energy signal;
    (b) determining if the first frequency and second frequency energy signals have constructively combined at a power receiving unit;
    (c) in response to determining that the first frequency and second frequency energy signals have not constructively combined at the power receiving unit, adjusting a value of the second frequency and returning to step (a); and
    (d) in response to determining that the first frequency and second frequency energy signals have constructively combined at the power receiving unit, continuing to transmit the first frequency and the second frequency energy signals.

7. The method of claim 6, wherein the act of determining is based at least partly upon a feedback signal received from the power receiving unit.

8. A method of receiving a wireless energy signal at a power receiving unit, the method comprising:
    (a) receiving a first frequency energy signal and a second frequency energy signal;
    (b) determining if a power level of the first frequency energy signal and the second frequency energy signal is greater than a power level of the first frequency energy signal;
    (c) in response to determining that the power level of the first and second frequency energy signals is not greater than the power level of the first frequency energy signal, returning to step (a); and
    (d) in response to determining that the power level of the first and second frequency energy signals is greater than the power level of the first frequency energy signal, transmitting a feedback signal to a power transmission unit.

9. The method of claim 8, wherein the feedback signal indicates that the power level of the first and second frequency energy signals is greater than the power level of the first frequency energy signal.

10. The method of claim 8, wherein the feedback signal comprises an indication of the power level of the first and second frequency energy signals.

11. The method of claim 8, wherein in response to determining that the power level of the first and second frequency energy signals is not greater than the power level of the first frequency energy signal, transmitting to the power transmission unit a feedback signal indicating that the power level has not increased.

12. A method of providing electrical power to an electronic device, the method comprising:
    transmitting a first energy signal to the electronic device;
    transmitting one or more additional energy signals to the electronic device, wherein each of the one or more additional energy signals is transmitted at a phase that is different than the first energy signal; and
    transmitting a feedback signal from the electronic device indicating whether the one or more additional energy signals constructively interferes with the first energy signal.

13. A system for providing electrical power to an electronic device, the system comprising:
    a power transmission unit configured to transmit one or more phases of an energy signal;
    a power receiving module configured to receive the one or more phases of the energy signal; and
    a feedback module configured to transmit a feedback signal to the power transmission unit indicating a level of constructive interference in the received one or more frequencies of the energy signal.

14. The system of claim 13, wherein the power transmission unit is further configured to transmit one or more frequencies of the energy signal and the power receiving module is configured to receive the one or more frequencies of the energy signal.

* * * * *